US007450823B2

United States Patent
Naitoh

(10) Patent No.: US 7,450,823 B2
(45) Date of Patent: Nov. 11, 2008

(54) HARD DISK RECORDER AND VIDEO RECORD APPARATUS

(75) Inventor: Tadahiro Naitoh, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 750 days.

(21) Appl. No.: 11/117,102

(22) Filed: Apr. 28, 2005

(65) Prior Publication Data

US 2005/0259978 A1    Nov. 24, 2005

(30) Foreign Application Priority Data

Apr. 28, 2004    (JP)    .............................. 2004-132690

(51) Int. Cl.
*H04N 5/00* (2006.01)
*H04N 7/00* (2006.01)
(52) U.S. Cl. ................... 386/117; 386/107; 386/125
(58) Field of Classification Search ............... 386/107, 386/117, 125, 124, 105, 106, 45, 46, 109, 386/111, 112
See application file for complete search history.

(56) References Cited

U.S. PATENT DOCUMENTS 6,678,324 B1 *    1/2004    Yamauchi ............... 375/240.04

FOREIGN PATENT DOCUMENTS

| JP | 07-135639 | * | 5/1995 |
| JP | 9-214879 | | 8/1997 |
| JP | 11-69281 | | 3/1999 |
| JP | 2002-152636 | | 5/2002 |

OTHER PUBLICATIONS

Patent Abstracts of Japan, Publication No. 2002-152636, Publication Date May 24, 2002, 1 page.
Patent Abstracts of Japan, Publication No. 09-214879, Publication Date Aug. 15, 1997, 1 page.
Patent Abstracts of Japan, Publication No. 11-069281, Publication Date Mar. 9, 1999, 1 page.

* cited by examiner

*Primary Examiner*—Robert Chevalier
(74) *Attorney, Agent, or Firm*—Osha Liang LLP

(57) ABSTRACT

To photograph with a digital video camera, a still image is photographed and is inserted at the point to set a chapter. To dub a photographed video from a camera to a hard disk recorder, compression processing of the video data is performed at a variable bit rate by an MPEG encoder in the recorder and the compressed data is recorded on a hard disk. The value of the bit rate is compared with a threshold value. If a state in which the bit rate is less than the threshold value continues for a given section or more, the video is determined a still image and a chapter is set in the portion of the still image.

2 Claims, 5 Drawing Sheets

HARD DISK RECORDER AND VIDEO RECORD APPARATUS

BACKGROUND OF THE INVENTION

1. Field of the Invention

This invention relates to a video record apparatus such as a hard disk recorder and in particular to chapter division in dubbing a video photographed with a photographing apparatus such as a digital video camera.

2. Description of the Related Art

Some video record apparatus such as a hard disk recorder (HDD recorder) can dub (record) a video photographed with a digital video camera (DV camera). To dub a video, the HDD recorder and the DV camera are connected by a cable and then a play key of the DV camera is operated. Then, the video photographed with the DV camera and recorded on tape is played back. In this state, if a record key of the HDD recorder (or an attached remote control) is operated, the played-back video output from the DV camera is recorded on a hard disk included in the HDD recorder. To stop dubbing the video, a stop key of the HDD recorder or the DV camera is operated.

Thus, after the DV camera is connected to the HDD recorder, the playback operation is performed in the DV camera and the record operation is performed in the HDD recorder, whereby dubbing from the DV camera to the HDD recorder can be performed. In this case, all of the record contents of the tape are dubbed intact to the hard disk by one record operation. However, only one file is created on the hard disk and if the record contents are made up of a plurality of parts, inconvenience occurs in finding the beginning at the edit or playback time. Then, to easily find the beginning, the file needs to be divided into chapters. Such chapter division arts are described in the following patent documents, for example:

The art described in JP-A-2002-152636 is as follows: A record-playback apparatus including an automatic chapter creation function allows the user to perform predetermined button operation for an already recorded video while seeing a played-back video, thereby setting a chapter and perform temporary stop operation for the video being recorded while seeing the recorded video, thereby setting a chapter. In the apparatus, however, the user needs to perform operation for setting a chapter after the video is captured or in the process of capturing the video and therefore the user cannot avoid being bothered with the inconvenience in dubbing.

JP-A-9-214879 describes a method of dividing a moving image into scene units. However, since a moving image is divided into scene units based on detection of a discontinuous point in the moving picture and thus is forcibly divided at the discontinuous point and a chapter cannot be set at the point desired by the user.

In JP-A-11-69281, reference frame data is extracted from compressed data and change in video is detected based on the reference frame data, whereby a representative image is extracted. However, in this case, scenes are also forcibly divided as in the art described in JP-A-9-214879 and thus a chapter cannot be set at the point desired by the user.

SUMMARY OF THE INVENTION

It is therefore an object of the invention to provide a video record apparatus that can automatically set a chapter at the user-desired position without performing any operation for dubbing.

According to the invention, there is provided a video record apparatus including an interface to which a photographing apparatus capable of photographing a still image and a moving image is connected, a signal processing section for performing compression processing of video data input from the photographing apparatus through the interface, and storage for recording the video data subjected to the compression processing by the signal processing section, wherein the bit rate of the video data is calculated to perform compression processing of the video data input from the photographing apparatus and if a state in which the calculated bit rate is less than a predetermined threshold value continues for a given section or more, the video from the photographing apparatus is determined a still image and a chapter is set in the portion of the still image.

In a typical embodiment of the invention, the photographing apparatus is a digital video camera and the video record apparatus is a hard disk recorder. The video data input from the digital video camera to the hard disk recorder is subjected to compression processing at a variable bit rate by an MPEG (Moving Picture Experts Group) encoder. In this case, if the video is a moving image, generally the bit rate becomes a high value and if the video is a still image, generally the bit rate becomes a low value and therefore a still image can be detected by providing a threshold value for the bit rate.

Thus, in the invention, the bit rate when compression processing of video data is performed is used to detect a still image, so that a file can be divided using the still image portion as a chapter separation. Thus, if a still image is inserted into any desired position at the photographing time, automatically the file is divided into chapters in the process of dubbing. Therefore, the need for performing operation to set a chapter during or after the dubbing is eliminated and the user is freed from complicated operation.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Figure 1:
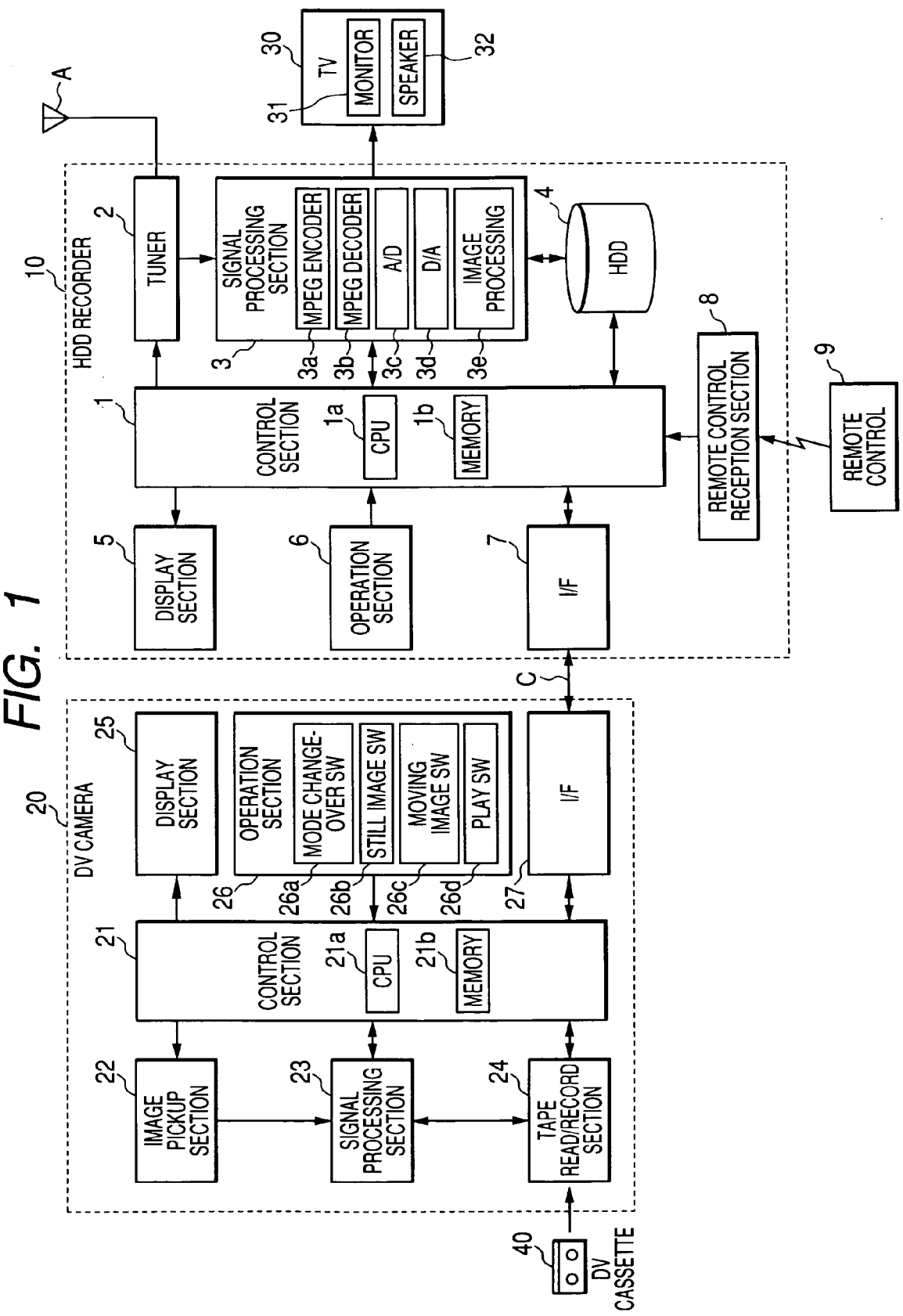
FIG. 1 is a block diagram to show an HDD recorder according to the invention together with a DV camera.

FIG. 1 is a block diagram to show a hard disk recorder (HDD recorder) according to the invention together with a digital video camera (DV camera). In FIG. 1, an HDD recorder 10 forms one embodiment of a video record apparatus in the invention and a DV camera 20 forms one embodiment of a photographing apparatus in the invention. The HDD recorder 10 and the DV camera 20 include interfaces 7 and 27 conforming to the IEEE 1394 standard and are connected by a cable C conforming to the standard. Thus, the HDD recorder 10 and the DV camera 20 can recognize each other and can communicate with each other. Numeral 30 denotes a television set (simply, TV) and the TV 30 is connected to the HDD recorder 10.

To begin with, the configuration of the HDD recorder 10 will be discussed. Numeral 1 denotes a control section for controlling the sections of the HDD recorder 10 and the control section 1 is made up of a CPU 1a, memory 1b such as RAM and ROM, and the like. A denotes an antenna for receiving airwaves of a TV program, etc., and numeral 2 denotes a tuner for performing channel selection of the airwaves received at the antenna A. Numeral 3 denotes a signal processing section and the signal processing section 3 includes an MPEG encoder 3a, an MPEG decoder 3b, an A/D converter 3c, a D/A converter 3d, and an signal processing circuit 3e. The signal processing section 3 processes the analog signal selected in the tuner 2 for output to the TV 30 and digitizes the signal by the A/D converter 3c and then converts the digitized data into compressed data in an MPEG2 (Moving Picture Experts Group Phase 2) format by the MPEG encoder 3a for output to an HDD (hard disk) 4. The signal processing section 3 converts video data input from the DV camera 20 through the cable C to the HDD recorder 10 into an analog signal by the D/A converter 3d for output to the TV 30 and converts the data into data in the MPEG2 format by the MPEG encoder 3a for output to the HDD 4.

The HDD 4 records data input from the control section 1 and the signal processing section 3 in a predetermined area and reads the data recorded in the predetermined area and outputs the read data to the control section 1 and the signal processing section 3. The compressed data in the MPEG2 format output from the HDD 4 to the signal processing section 3 is decoded by the MPEG decoder 3b in the signal processing section 3 and is converted into an analog signal by the D/A converter 3d for output to the TV 30. The TV 30 displays video on a monitor 31 and outputs voice from a speaker 32 based on the analog signal from the signal processing section 3. Image data on-screen displayed on the monitor 31 of the TV 30 is stored in OSD (on screen display) memory contained in the signal processing circuit 3e of the signal processing section 3.

Figure 2:
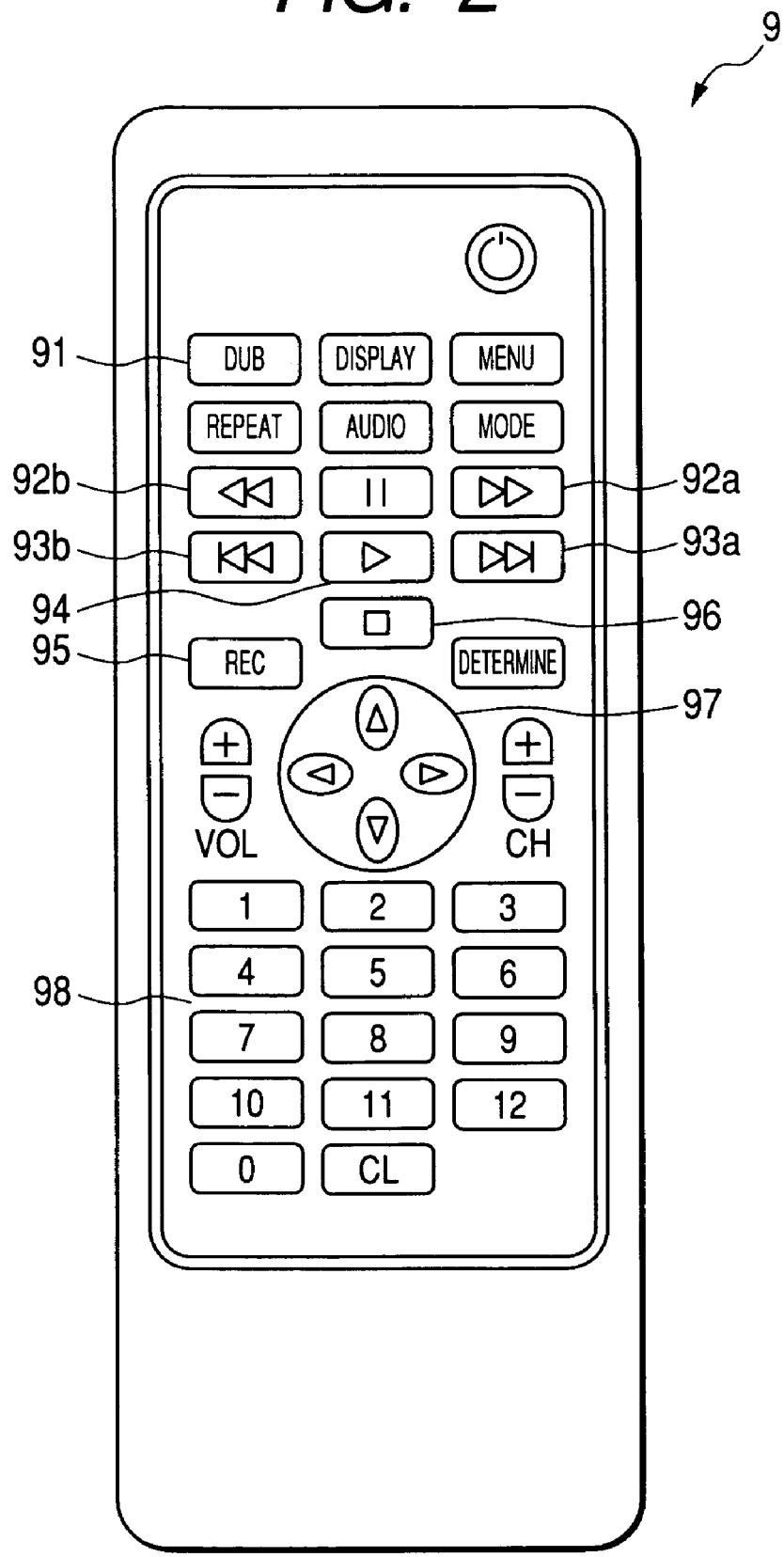
FIG. 2 is a drawing to show a remote control of the HDD recorder.

Numeral 5 denotes a display section implemented as a vacuum fluorescent display for displaying the operation state of the HDD recorder 10, the time, and the like. Numeral 6 denotes an operation section made up of various operation keys provided on the main unit section of the HDD recorder 10. Numeral 8 denotes a remote control reception section for receiving a signal from a remote control 9. The remote control 9 is provided with various operation keys as shown in FIG. 2. Important keys are as follows: Numeral 91 denotes a dub key, numeral 92a denotes a fast forward key, numeral 92b denotes a rewind key, numeral 93a denotes a feed direction skip key, numeral 93b denotes a return direction skip key, numeral 94 denotes a play key, numeral 95 denotes a record key, a numeral 96 denotes a stop key, numeral 97 denotes cursor keys, and numeral 98 denotes digit keys. The dub key 91 may be omitted for using the record key 95 as the dub key.

In the described HDD recorder 10, the control section 1 forms a bit rate calculation unit, a first determination unit for determining whether or not the bit rate is equal to or greater than a predetermined threshold value, a second determination unit for determining whether or not a state in which the bit rate is less than the threshold value continues for a given section or more, and a chapter setting unit for setting a chapter in a still image portion of video in the invention. The HDD 4 forms storage in the invention.

Next, the configuration of the DV camera 20 will be discussed. Numeral 21 denotes a control section for controlling the sections of the DV camera 20 and the control section 21 is made up of a CPU 21a, memory 21b such as RAM or ROM, and the like. Numeral 22 denotes an image pickup section for photographing a video and the image pickup section 22 includes an image pickup device such as CCD. Numeral 23 denotes a signal processing section and the signal processing section 23 digitizes the video photographed in the image pickup section 22 and then converts the digitalized video into data compressed in a DV (digital video) format for output to a tape read/record section 24. The tape read/record section 24 writes the data from the signal processing section 23 onto tape of a DV cassette 40 placed in the DV camera 20 and reads record data on tape and outputs the read data to the signal processing section 23. The data sent from the tape read/record section 24 to the signal processing section 23 is played back in the signal processing section 23. Numeral 25 denotes a display section implemented as a liquid crystal display for displaying the video photographed in the image pickup section 22 and the video played back in the signal processing section 23. Numeral 26 denotes an operation section provided on the DV camera 20 and the operation section 26 includes a mode changeover switch 26a, a still image switch 26b, a moving image switch 26c, and a play switch 26d. The operation section 26 is also provided with a key for adding information of a title, etc., to the record video and the like in addition to the switches. The control section 21 sends the video played back in the signal processing section 23 to the HDD recorder 10 through the cable C from the interface 27.

In the DV camera 20, if the user sets the mode changeover switch 26a of the operation section 26 to a photograph mode and operates the moving image switch 26c, a moving image is photographed by the image pickup section 22 and is recorded on tape of the DV cassette 40 by the signal processing section 23 and the tape read/record section 24. If the user operates the still image switch 26b in the photograph mode, a still image is photographed by the image pickup section 22 and is recorded on tape of the DV cassette 40 by the signal processing section 23 and the tape read/record section 24. If the user sets the mode changeover switch 26a to a playback mode and operates the play switch 26d, the video recorded on the tape is read by the tape read/record section 24 and is processed by the signal processing section 23 for display on the display section 25.

Figure 3:
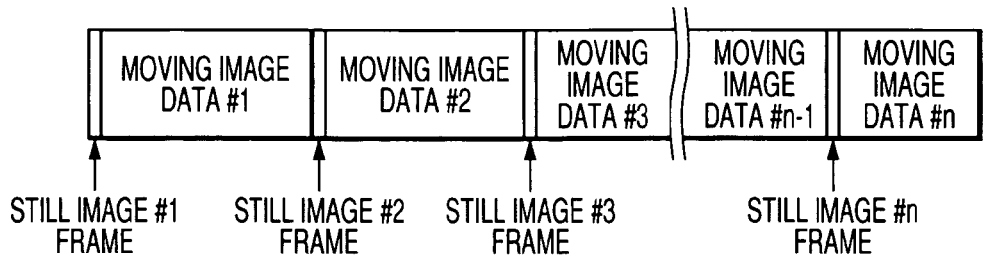
FIG. 3 is a drawing to show an example of video data photographed with the DV camera.
Figure 5:
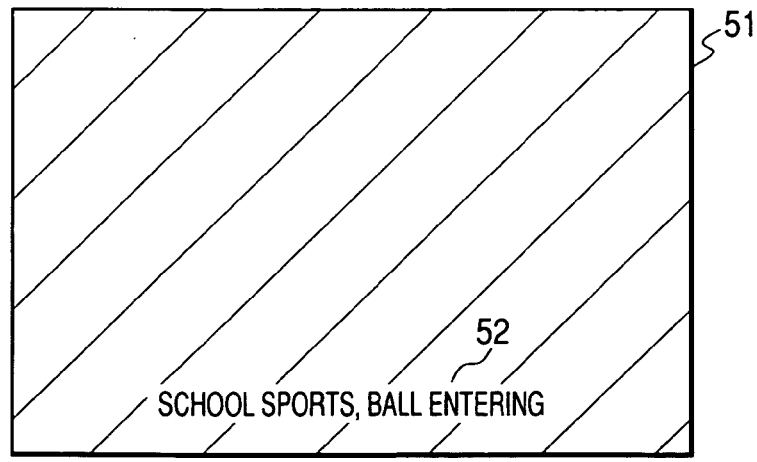
FIG. 5 is a drawing to show an example of a still image.

FIG. 3 is a drawing to show an example of video data photographed with the DV camera 20 and recorded on the tape of the DV cassette 40. To photograph a moving image in the photograph mode, if the user wants to divide the video data into chapters in response to the record contents, the user operates the still image switch 26b at the chapter separation point and photographs a still image. The photographed still image is inserted into the tape as a still image frame. Then, the user operates the moving image switch 26c and photographs a moving image. If the user wants to set the next chapter, the user again operates the still image switch 26b and photographs a still image and inserts a still image frame. As the user repeats the sequence, the moving image data is recorded on the tape of the DV cassette 40 with the still image frame sandwiched between one moving image data piece and another, as shown in FIG. 3. FIG. 5 is a drawing to show an example of a still image (playback video). Numeral 51 denotes a photographed still image and numeral 52 denotes an entered chapter title.

To dub from the DV camera 20 to the HDD recorder 10, first the user connects the interface 7 of the HDD recorder 10 and the interface 27 of the DV camera 20 by the cable C. Then, the user switches the mode changeover switch 26a of the DV camera 20 to the playback mode and operates the play switch 26d and also operates the dub key 91 of the remote control 9 for giving a dub command to the HDD recorder 10. Accordingly, in the DV camera 20, the video data recorded on the DV cassette 40 is played back by the tape read/record section 24 and the signal processing section 23 and the playback video data is sent from the control section 21 via the interface 27 and the cable C to the HDD recorder 10.

In the HDD recorder 10, the control section 1 receives the sent video data through the interface 7. The control section 1 temporarily stores the received video image in a buffer area of the image 1b in sequence and also reads the stored data in sequence and sends the read data to the signal processing section 3. The signal processing section 3 converts (codes) the playback video data into data in the MPEG2 format by the MPEG encoder 3a to generate compressed video data. The generated compressed data is recorded on the HDD 4.

In this case, the data compression processing of the MPEG encoder 3a is performed in accordance with variable bit rate. The bit rate is a value representing the data transmission capability and is a fixed bit rate at which a constant amount of data is transmitted per unit time or a variable bit rate for changing the data amount in response to video. To adopt the variable bit rate, motion of a video element between the preceding and following frames is detected and the bit rate is set high for the video with large motion change and is set low for the video with small motion change. Therefore, the bit rate for a still image becomes an extremely low value as compared with that for a moving image. For example, the bit rate of a moving image may become about 10 Mbps at the maximum; the bit rate of a still image generally is 2 Mbps or less.

Figure 4:
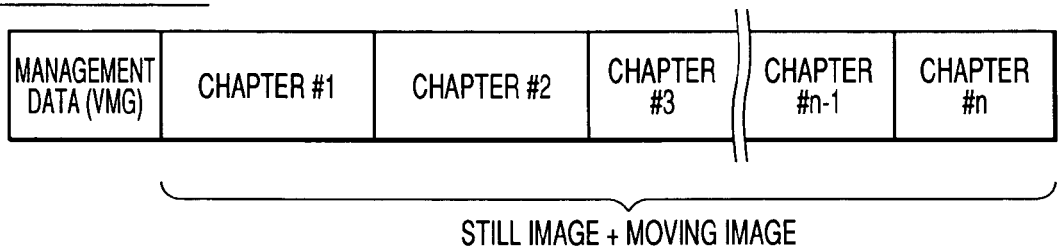
FIG. 4 is a drawing to show an example of video data recorded on an HDD.

Then, it is made possible to detect a still image frame shown in FIG. 3 by referencing the value of the bit rate set when the MPEG encoder 3a performs compression processing of video data. Specifically, the bit rate is compared with a predetermined threshold value (for example, 2 Mbps) and if a state in which the bit rate is less than the threshold value continues for a given section (for example, 5 seconds), the video is determined a still image. If the video is determined a still image, the control section 1 sets a chapter in the portion of the still image and then records the video on the HDD 4. Accordingly, the data divided into chapters as shown in FIG. 4 is recorded on the HDD 4. In FIG. 4, chapter #1 is made up of still image frame #1 and moving image data #1 in FIG. 3, chapter #2 is made up of still image frame #2 and moving image data #2 in FIG. 3, and so forth. Attribute information of position information of each chapter, etc., is recorded in management data (VMG) at the beginning in FIG. 4.

Thus, in the embodiment, a still image is detected from the bit rate and a chapter is set, so that if the user performs only dubbing operation from the DV camera 20 to the HDD recorder 10, automatically a chapter is set in the process of the dubbing and the data divided into chapters is recorded on the HDD 4. Thus, the user need not perform any operation while dubbing is performed. It is also possible to make a chapter search immediately after the dubbing is complete; excellent ease of use is provided.

Figure 6:
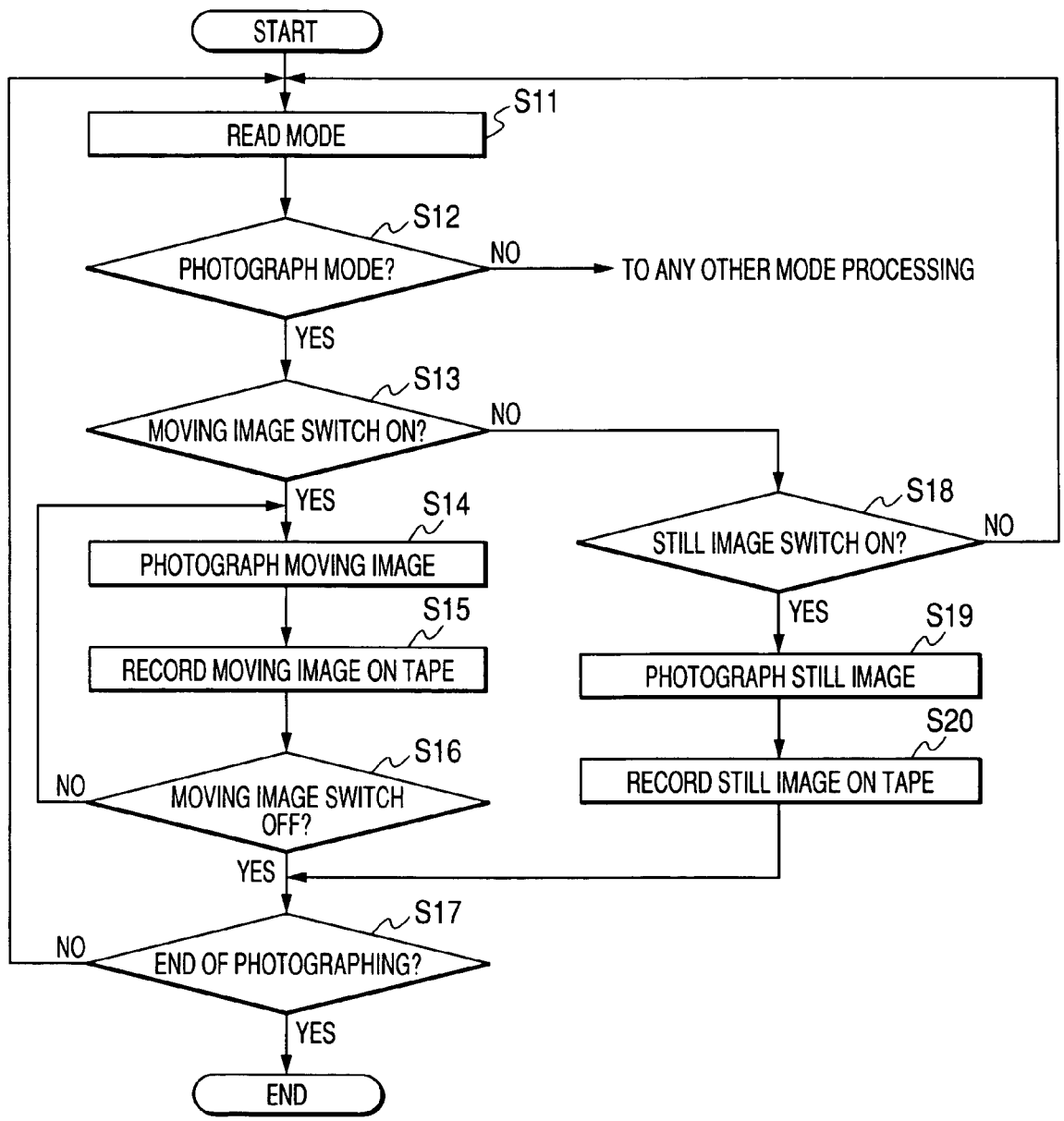
FIG. 6 is a flowchart to show the operation of the DV camera.

FIG. 6 is a flowchart to show the operation of the DV camera and represents a procedure at the photographing time. The procedure is executed by the CPU 21a of the control section 21. First, which mode the mode changeover switch 26a is set to is read (step S11) and whether or not the mode is the photograph mode is determined (step S12). If the mode is not the photograph mode (NO at step S12), a transition is made to any other mode processing (for example, playback processing). If the mode is the photograph mode (YES at step S12), then whether or not the moving image switch 26c is turned on is determined (step S13). If the moving image switch 26c is on (YES at step S13), a moving image is photographed by the image pickup section 22 (step S14) and the photographed moving image is processed by the signal processing section 23 and is recorded on the DV cassette 40 by the tape read/record section 24 (step S15). Then, whether or not the moving image switch 26c is turned off is determined (step S16). If the moving image switch 26c is not turned off (NO at step S16), the process returns to step S14 and moving image photographing is continued. If the moving image switch 26c is turned off (YES at step S16), whether or not the photographing terminates is determined (step S17). If the photographing terminates (YES at step S17), the operation is terminated; if the photographing does not terminate (NO at step S17), the process returns to step S11.

On the other hand, if the moving image switch 26c is not turned on (NO at step S13) in the photograph mode, whether or not the still image switch 26b is turned on is determined (step S18). If the still image switch 26b is on (YES at step S18), a still image is photographed by the image pickup section 22 (step S19) and the photographed still image is processed by the signal processing section 23 and is recorded on the DV cassette 40 by the tape read/record section 24 (step S20). Then, the process goes to step S17. If the still image switch 26b is not on (NO at step S18), it is determined that photographing operation is not yet performed, and the process returns to step S11. As the procedure sequence is executed, the video data in FIG. 3 is recorded on the DV cassette 40.

Figure 7:
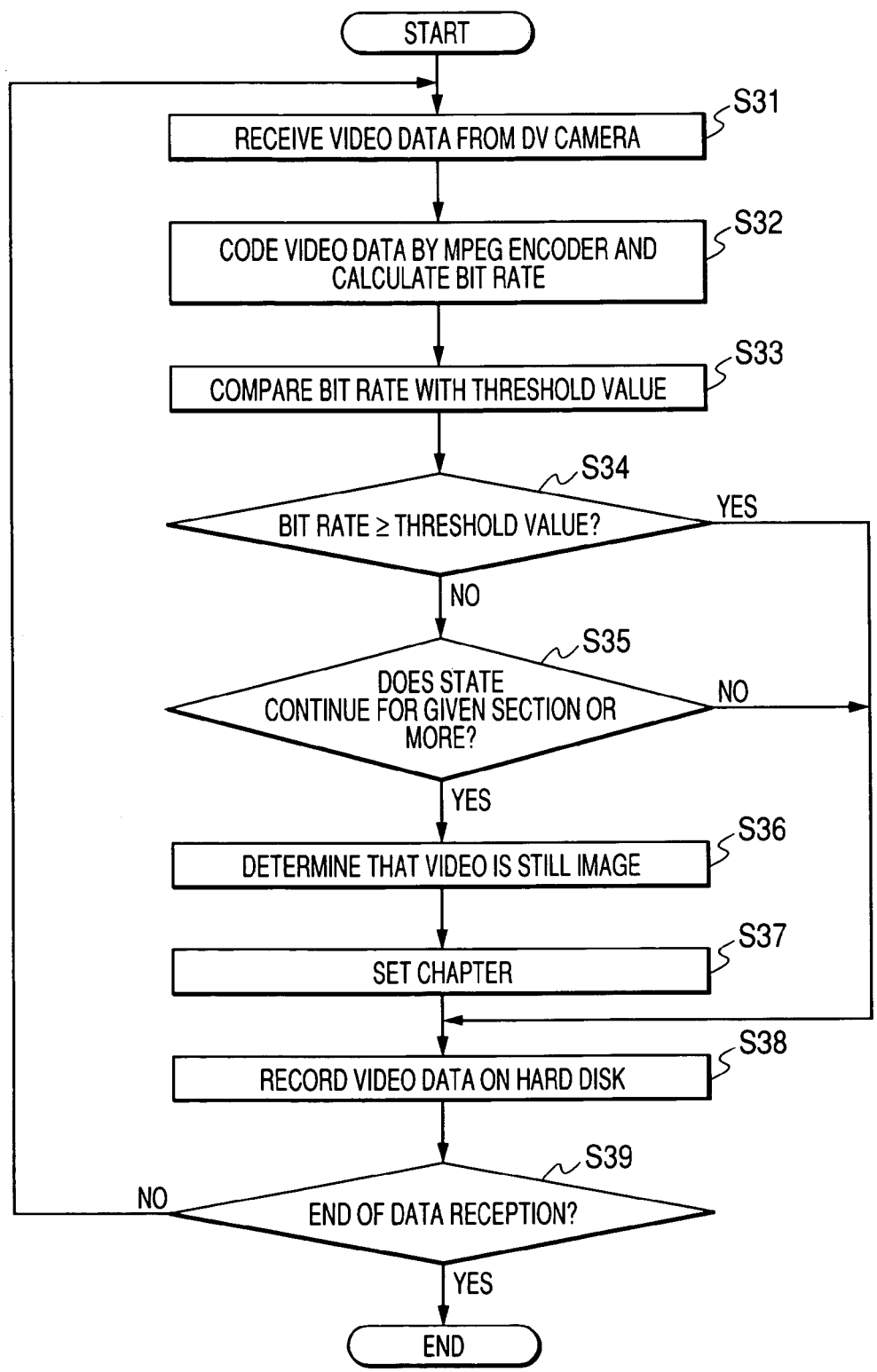
FIG. 7 is a flowchart to show the operation of the HDD recorder.

FIG. 7 is a flowchart to show the operation of the HDD recorder 10 and represents a procedure at the dubbing time. The procedure is executed by the CPU 1a of the control section 1. As described above, when the user connects the HDD recorder 10 and the DV camera 20 by the cable C, sets the DV camera 20 to the playback mode, and operates the dub key 91 of the remote control 9, dubbing is started and video data sent from the DV camera 20 is received in the HDD recorder 10 (step S31). The received video data is sent to the signal processing section 3, which then codes the video data into the MPEG2 format by the MPEG encoder 3a to generate compressed data (step S32). At this time, the bit rate responsive to the data amount of the video is calculated and compression processing is performed in accordance with the calculated bit rate.

Subsequently, a comparison is made between the calculated bit rate and a threshold value (step S33). If the bit rate is equal to or greater than the threshold value (YES at step S34) as the result of the comparison, the video is determined a moving image and the process goes to step S38 and the video data in the MPEG2 format is recorded on the HDD 4. Whether or not reception of the data from the DV camera 20 terminates is determined (step S39). If the data reception terminates (YES at step S39), the processing is terminated; if the data reception does not terminate (NO at step S39), the process returns to step S31 and reception of the data from the DV camera 20 is continued.

On the other hand, if the bit rate is less than the threshold value (NO at step S34) as the comparison result between the bit rate and the threshold value, whether or not the state continues for a given section or more is determined (step S35). If the state in which the bit rate is less than the threshold value continues for the given section or more (YES at step S35), the video is determined a still image (step S36) and a chapter is set in the part of the still image frame (step S37). Then, the video data is recorded on the HDD 4 (step S38). If the state in which the bit rate is less than the threshold value does not continue for the given section or more (NO at step S35), the video is determined a moving image and the process goes to step S38 and the video data is recorded on the HDD 4.

In the described embodiment, to dub, the user operates the mode changeover switch 26*a* and the play switch 26*d* of the DV camera 20, but the user may be made able to operate the playback operation of the DV camera 20 with the HDD recorder 10. To do this, the switches of the DV camera 20 may be on-screen displayed on the screen of the monitor 31 of the TV 30 for the user to operate any switch on the screen with the remote control 9. Alternatively, the play key for the DV camera 20 may be provided on the remote control 9 or the main unit of the HDD recorder 10.

In the described embodiment, the case where the video photographed with the DV camera 20 is recorded on the tape of the DV cassette 40 is taken as an example, but the record medium of the photographed image is not limited to the tape and may be a memory card, a disk, etc., for example. Further, the photographing apparatus is not limited to a digital video camera and video data photographed using an analog video camera may be converted into digital data in a predetermined format by the recorder.

In the described embodiment, the HDD recorder 10 is taken as an example of the video record apparatus, but the invention can also be applied to video record apparatus such as a DVD recorder and a DVD recorder incorporating a hard disk.

What is claimed is:

1. A hard disk recorder comprising:

an interface to which a digital video camera capable of photographing a still image and a moving image is connected;

a signal processing section for performing compression processing of video data input from the digital video camera through the interface at a variable bit rate by an MPEG encoder;

a hard disk for recording the video data subjected to the compression processing by the signal processing section;

a bit rate calculation unit for calculating the bit rate of the video data to perform compression processing of the video data input from the digital video camera;

a first determination unit for determining whether or not the calculated bit rate is equal to or greater than a predetermined threshold value;

a second determination unit for determining whether or not a state in which the bit rate is less than the threshold value continues for a given section or more; and a chapter setting unit for determining that the video from the digital video camera is a still image and setting a chapter in the portion of the still image if the first determination unit determines that the bit rate is less than the threshold value and the second determination unit determines that the state in which the bit rate is less than the threshold value continues for the given section or more.

2. A video record apparatus comprising:

an interface to which a photographing apparatus capable of photographing a still image and a moving image is connected;

a signal processing section for performing compression processing of video data input from the photographing apparatus through the interface;

a storage unit for recording the video data subjected to the compression processing by the signal processing section, wherein:

the bit rate of the video data is calculated to perform compression processing of the video data input from the photographing apparatus; and if a state in which the calculated bit rate is less than a predetermined threshold value continues for a given section or more, the video from the photographing apparatus is determined a still image; and a chapter is set in the portion of the still image.

* * * * *